(12) United States Patent
Makino et al.

(10) Patent No.: US 9,077,222 B2
(45) Date of Patent: Jul. 7, 2015

(54) IN-WHEEL MOTOR DRIVE ASSEMBLY

(75) Inventors: Tomoaki Makino, Iwata (JP); Ken Yamamoto, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 13/498,167

(22) PCT Filed: Sep. 13, 2010

(86) PCT No.: PCT/JP2010/065742
§ 371 (c)(1),
(2), (4) Date: Mar. 26, 2012

(87) PCT Pub. No.: WO2011/043161
PCT Pub. Date: Apr. 14, 2011

(65) Prior Publication Data
US 2012/0181848 A1 Jul. 19, 2012

(30) Foreign Application Priority Data

Oct. 9, 2009 (JP) .................................. 2009-235111

(51) Int. Cl.
| | |
|---|---|
| *H02K 1/32* | (2006.01) |
| *H02K 9/19* | (2006.01) |
| *B60K 7/00* | (2006.01) |
| *F16H 1/32* | (2006.01) |
| *H02K 7/14* | (2006.01) |
| *B60K 17/04* | (2006.01) |
| *B60K 1/00* | (2006.01) |
| *H02K 5/20* | (2006.01) |

(52) U.S. Cl.
CPC ............... *H02K 9/19* (2013.01); *B60K 7/0007* (2013.01); *B60K 17/046* (2013.01); *B60K 2001/003* (2013.01); *B60K 2007/0038* (2013.01); *B60K 2007/0092* (2013.01); *F16H 1/32* (2013.01); *H02K 1/32* (2013.01); *H02K 5/20* (2013.01); *H02K 7/14* (2013.01); *Y02T 10/641* (2013.01)

(58) Field of Classification Search
USPC .......... 310/52, 54, 59, 60 R, 60 A; 180/65.51
See application file for complete search history.

(56) References Cited

U.S. PATENT DOCUMENTS

| | | | |
|---|---|---|---|
| 5,111,090 A | 5/1992 | Otake et al. | |
| 5,372,213 A | 12/1994 | Hasebe et al. | |
| 6,355,996 B1 * | 3/2002 | Birkestrand | ..................... 310/54 |
| 7,527,113 B2 * | 5/2009 | Jenkins | ...................... 180/65.51 |
| 2005/0236198 A1 | 10/2005 | Jenkins | |
| 2006/0219449 A1 * | 10/2006 | Mizutani et al. | ............. 180/65.5 |
| 2008/0083572 A1 | 4/2008 | Ishida et al. | |
| 2009/0038865 A1 | 2/2009 | Moriguchi et al. | |

FOREIGN PATENT DOCUMENTS

| | | |
|---|---|---|
| CN | 1663837 | 9/2005 |
| JP | 07-46620 | 10/1995 |
| JP | 2006-264396 | 10/2006 |
| JP | 2007-057015 | 3/2007 |
| JP | 2007-099106 | 4/2007 |
| JP | 2008-207585 | 9/2008 |
| JP | 2009-063043 | 3/2009 |
| JP | 2009-090736 | 4/2009 |
| JP | 2009-216190 | 9/2009 |
| JP | 2009-227130 | 10/2009 |

* cited by examiner

*Primary Examiner* — Jeffrey J Restifo
*Assistant Examiner* — Erez Gurari
(74) *Attorney, Agent, or Firm* — Clark & Brody

(57) ABSTRACT

This air-cooled type in-wheel motor drive assembly 21 includes a lubrication oil circuit for lubricating a speed reduction unit B by allowing lubrication oil discharged from a lubrication oil pump 51 to flow through interconnected oil passages 54, 55, 56 provided to a casing 22, motor-rotary-shaft oil passage 57, speed-reduction-unit input-shaft oil passage 58 and interior of the speed reduction unit B, and for cooling a motor unit A and the speed reduction unit B with the lubrication oil cooled with the aid of outer fins 22f while flowing through the oil passages 54, 55, 56 provided to the casing.

12 Claims, 9 Drawing Sheets

IN-WHEEL MOTOR DRIVE ASSEMBLY

TECHNICAL FIELD

The present invention relates to an in-wheel motor drive assembly used as a power source of a vehicle, in which a rotary shaft of an electrically operated motor and a hub of a wheel are connected via a speed reducer.

BACKGROUND ART

A conventional in-wheel motor drive assembly is disclosed in Japanese Unexamined Patent Application Publication No. 2009-63043 (PTL 1). The in-wheel motor drive assembly in PTL 1 includes a motor unit, a speed reduction unit, a wheel hub and a reducer lubricating mechanism for supplying lubrication oil to the speed reduction unit. A casing of the motor unit is provided with cooling paths and a heat sink. Cooling water flowing through the cooling paths cools the motor unit.

CITATION LIST

Patent Literature

PTL 1: Japanese Unexamined Patent Application Publication No. 2009-63043 (page 8, FIG. 1)

SUMMARY OF INVENTION

Technical Problem

The conventional in-wheel motor drive assembly still needs to be improved to overcome the following problems: additional formation of cooling paths; and reduction of a suspension system's terrain-following ability due to a weight increase of the in-wheel motor drive assembly caused by the addition of the cooling paths and cooling water.

In general, the smaller a weight on the side of a wheel supported by the suspension system, a so-called unsprung weight, is, the greater the ability to follow bumps and potholes on roads increases. Because of this, the in-wheel motor drive assembly supported with the wheel by the suspension system is desired to be as light as possible.

In addition, since an energized motor unit generates high heat, it is desired that the temperature rise in the motor unit be suppressed.

In view of the above-mentioned circumstances, the present invention has an object to provide a lightweight in-wheel motor drive assembly capable of using air cooling to prevent the temperature rise of the motor unit.

Solution to Problem

The in-wheel motor drive assembly of the present invention made for achieving the object includes: a casing having an outer fin set including a plurality of fins formed along an outer circumferential surface of the cylindrical casing; a motor unit housed in the casing and including a motor rotary shaft for outputting rotation; a speed reduction unit housed in the casing, including an input shaft connected with the motor rotary shaft and an output shaft, reducing the rotational speed of the input shaft and transmitting the reduced rotation to the output shaft; a wheel hub rotatably supported by the casing and fixedly connected with the output shaft; and a lubrication oil circuit. The lubrication oil circuit includes a lubrication oil pump discharging lubrication oil, an oil passage provided to the casing, a motor-rotary-shaft oil passage provided in the motor rotary shaft, and a speed-reduction-unit input-shaft oil passage provided in the input shaft. The lubrication oil discharged from the lubrication oil pump circulates through the interconnected oil passage provided to the casing, motor-rotary-shaft oil passage, speed-reduction-unit input-shaft oil passage and an interior of the speed reduction unit to lubricate the speed reduction unit, and the lubrication oil cooled in the oil passage provided to the casing with the aid of the outer fin set cools the motor unit and speed reduction unit.

According to the present invention, the air-cooled type in-wheel motor drive assembly includes the lubrication oil circuit for lubricating the speed reduction unit by allowing the lubrication oil discharged from the lubrication oil pump to flow through the interconnected oil passage provided to the casing, motor-rotary-shaft oil passage, speed-reduction-unit input-shaft oil passage and interior of the speed reduction unit, and for cooling the motor unit and speed reduction unit with the lubrication oil cooled in the oil passage provided to the casing with the aid of the outer fin set. This achieves center-shaft lubrication in which the lubrication oil is supplied from the speed-reduction-unit input-shaft oil passage to the interior of the speed reduction unit to thereby effectively lubricate the speed reduction unit. In addition, the outer fin set formed on the outer surface of the casing cools the lubrication oil that cools the motor unit and speed reduction unit. Thus, the motor unit and speed reduction unit can be efficiently cooled by air.

This configuration does not require additional coolant paths and passages for other kinds of fluids, such as cooling water, other than lubrication oil in the casing, thereby making the in-wheel motor drive assembly light in weight.

The outer fin set of the present invention can be projections each having a large surface area and formed along the outer circumferential surface of the cylindrical casing, that provide good dissipation of heat. There is no limit to the places where the fin set can be formed on the outer circumferential surface of the casing. In a preferred embodiment, the outer fin set is formed on an outer surface of a portion of the casing that encloses the motor unit. This embodiment enables heat dissipation enhancement of the motor unit, which generates heat the most, and can air-cool the motor unit efficiently. Although it is not illustrated, it is also effective to provide a fin set on a rear cover of the casing.

The present invention does not specifically limit the shape of an outer fin. In a preferred embodiment, the motor rotary shaft of the motor unit is coaxially aligned with the wheel hub. The outer fin set includes a plurality of elongated projections extending in the circumferential direction of the casing and formed with spaces therebetween. According to the embodiment, when wheels mounted on the wheel hubs move on a road, wind flows in parallel with the direction in which the fins extend, and therefore the fins can air-cool the motor unit efficiently with little air resistance. A more preferable outer fin set includes a plurality of elongated projections extending continuously or intermittently along almost the entire circumference of the casing and is formed with spaces therebetween in the axial direction of the motor rotary shaft.

In a preferred embodiment, the outer fin set is further formed on an outer surface of a portion of the casing that encloses the motor unit, on an outer surface of a portion that encloses the speed reduction unit, and on an outer surface of a portion that rotatably supports the wheel hub. The embodiment can improve the cooling efficiency of the motor unit, speed reduction unit and wheel hub. Therefore, the temperature rise of the in-wheel motor drive assembly can be further suppressed by air-cooling.

The lubrication oil pump can be provided inside the air-cooled type in-wheel motor drive assembly or can be provided separately away from the air-cooled type in-wheel motor drive assembly. In an embodiment, the lubrication oil pump is provided inside the casing. According to the embodiment, the lubrication oil pump that is provided inside the casing can be driven by an output of the motor unit.

Preferably, the lubrication oil pump is driven by the output shaft of the speed reduction unit. Since the output shaft of the speed reduction unit that drives the lubrication oil pump outputs speed-reduced high-torque rotation, this embodiment can increase the discharge pressure of the lubrication oil.

Alternatively, as another embodiment, the lubrication oil pump can be separately provided outside the casing. According to the embodiment, the weight of the air-cooled type in-wheel motor drive assembly can be reduced and thereby the unsprung weight of the suspension can be further reduced.

Although the present invention is not limited to an embodiment, the speed reduction unit can be a speed reduction mechanism including planetary gear trains. In another embodiment, the speed reduction unit may adopt a cycloid reduction mechanism that reduces the rotational speed of the input shaft and transmits the reduced rotation to the output shaft, and includes a disk-like eccentric member connected to an end of the input shaft so as to be eccentric from a rotational axis of the input shaft, a revolution member whose inner circumference is attached to the outer circumference of the eccentric member so as to rotate with respect to the eccentric member, the revolution member making orbital motion around the rotational axis with rotation of the input shaft, a perimeter engagement member engaging with the outer perimeter of the revolution member to allow the revolution member to make axial rotation, and a motion conversion mechanism extracting only the axial rotation of the revolution member to transmit it to the output shaft. This embodiment adopting the cycloid reduction mechanism can achieve a considerably high reduction ratio.

The motion conversion mechanism is not limited to an embodiment; however, a motion conversion mechanism in an example includes a plurality of holes equidistantly formed in the revolution member in a circumferential direction about a rotational axis and a plurality of inner engagement members equidistantly provided on an end of the output shaft in the circumferential direction about the axis of the output shaft and fitting in the holes.

In an alternative embodiment, the motion conversion mechanism includes a plurality of holes equidistantly formed in an end of the output shaft in a circumferential direction about the axis of the output shaft and a plurality of inner engagement members equidistantly provided to the revolution member in a circumferential direction about the rotational axis.

The present invention is not limited to an embodiment; however, the casing in an example includes a plurality of elongated projecting fins extending in parallel with the axial direction and formed in the circumferential direction with spaces therebetween. The elongated projecting fins are arranged at axially the same position as a wheel hub bearing for rotatably supporting the wheel hub and radially outside the wheel hub bearing. According to the embodiment, the wheel hub bearing can be properly air-cooled.

The air-cooled type in-wheel motor drive assembly of the the present invention is likely to be applied to various embodiments. For example, the air-cooled type in-wheel motor drive assembly further includes an air-cooled type oil cooler provided separately away from the motor unit and having a lubrication oil inlet port and a lubrication oil outlet port connected to the oil passage provided to the casing to cool the lubrication oil supplied from the lubrication oil circuit and return the lubrication oil to the lubrication oil circuit. The additionally provided air-cooled type oil cooler according to the embodiment can further lower the temperature of the lubrication oil, thereby efficiently cooling the motor unit and speed reduction unit.

In addition, for example, the lubrication oil circuit further includes a rotor oil passage that is branched off from the motor-rotary-shaft oil passage and provided to the rotor of the motor unit. This embodiment enables effective cooling of the rotor of the motor unit. Even if the motor unit is a large-diameter motor unit that is difficult to be cooled by a conventional cooling system, the temperature rise of the whole motor unit can be prevented.

In addition, for example, the lubrication oil circuit further includes a stator branch oil passage that is branched off from an oil passage connecting a discharge port of the lubrication oil pump and the motor-rotary-shaft oil passage to supply the lubrication oil to a stator of the motor unit. According to the embodiment, the stator of the motor unit can be effectively cooled.

Advantageous Effects of Invention

As described above, the air-cooled type in-wheel motor drive assembly of the present invention can effectively lubricate the interior of the speed reduction unit by action of center-shaft lubrication with the lubrication oil discharged from the lubrication oil pump and flowing through the interconnected oil passages provided to the casing, motor-rotary-shaft oil passage, speed-reduction-unit input-shaft oil passage and interior of the speed reduction unit, and can efficiently cool the motor unit and speed reduction unit with the lubrication oil air-cooled with the aid of the outer fin set while circulating in the motor unit and speed reduction unit. According to the present invention, the present invention does not need to have cooling paths and cooling water, thereby decreasing the weight of the air-cooled type in-wheel motor drive assembly. As a result, the unsprung weight can be reduced, and the suspension system can suitably absorb shock caused by bumps and potholes on the road to improve the riding comfort of the vehicle.

DESCRIPTION OF EMBODIMENTS

Figure 1:
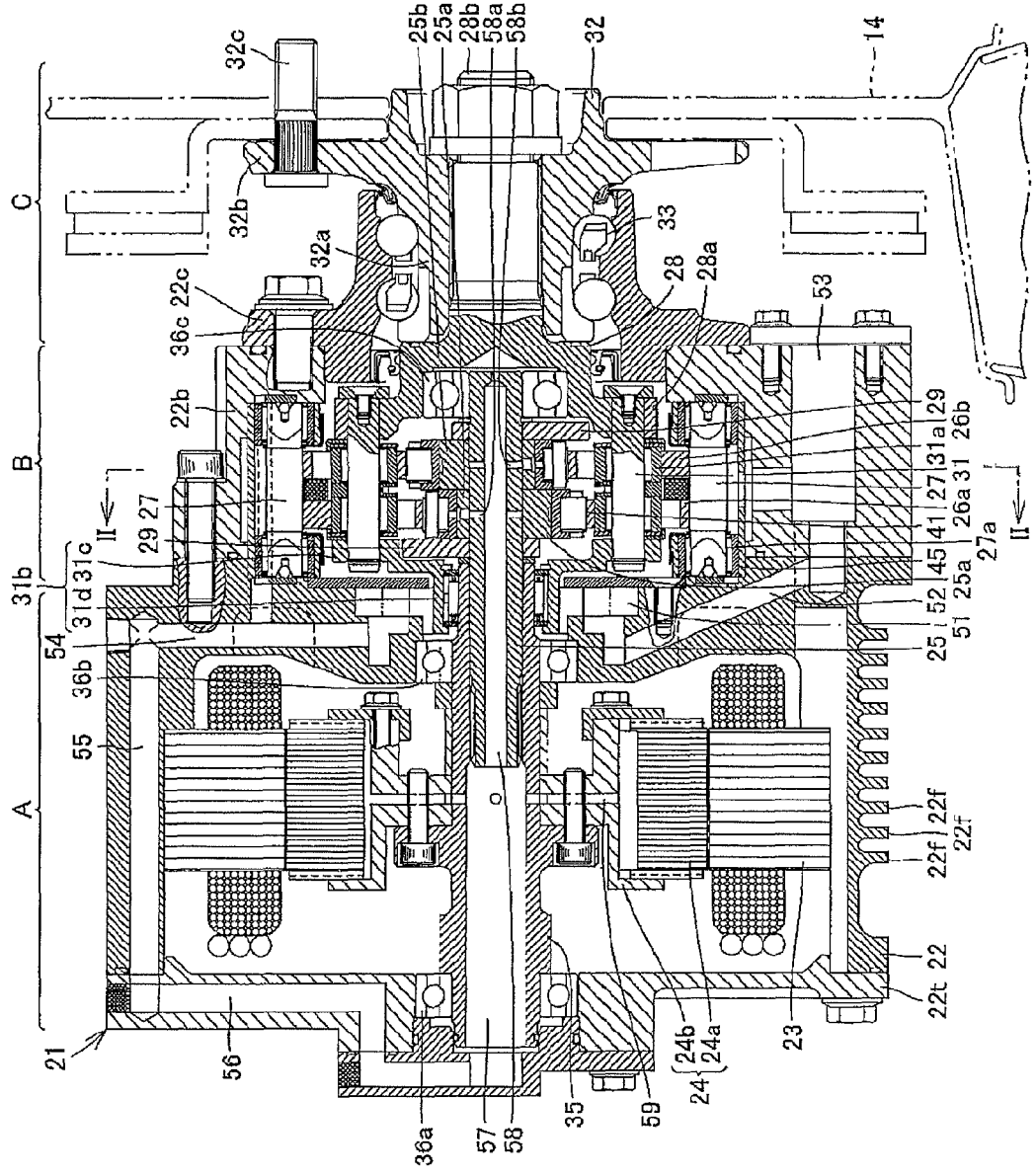
FIG. 1 is a vertical cross-sectional view of an in-wheel motor drive assembly according to the first example of the present invention.
Figure 2:
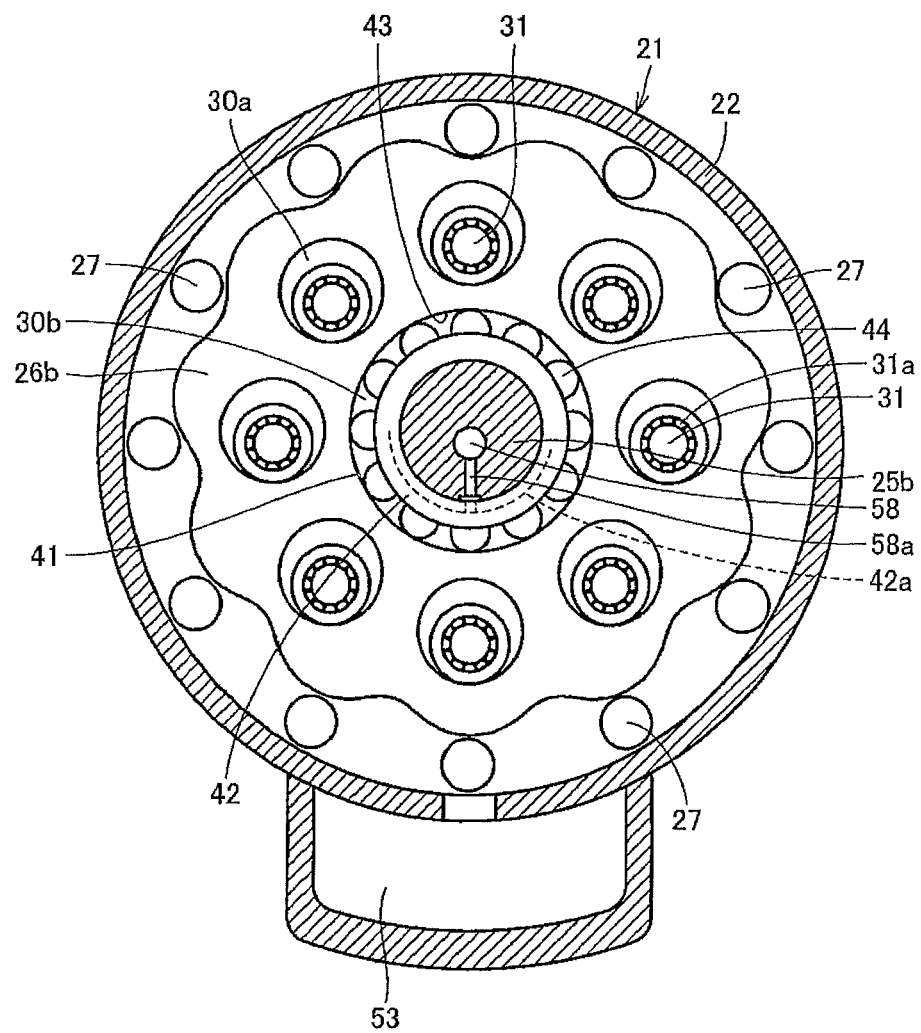
FIG. 2 is a cross-sectional view taken from line II-II in FIG. 1.
Figure 3:
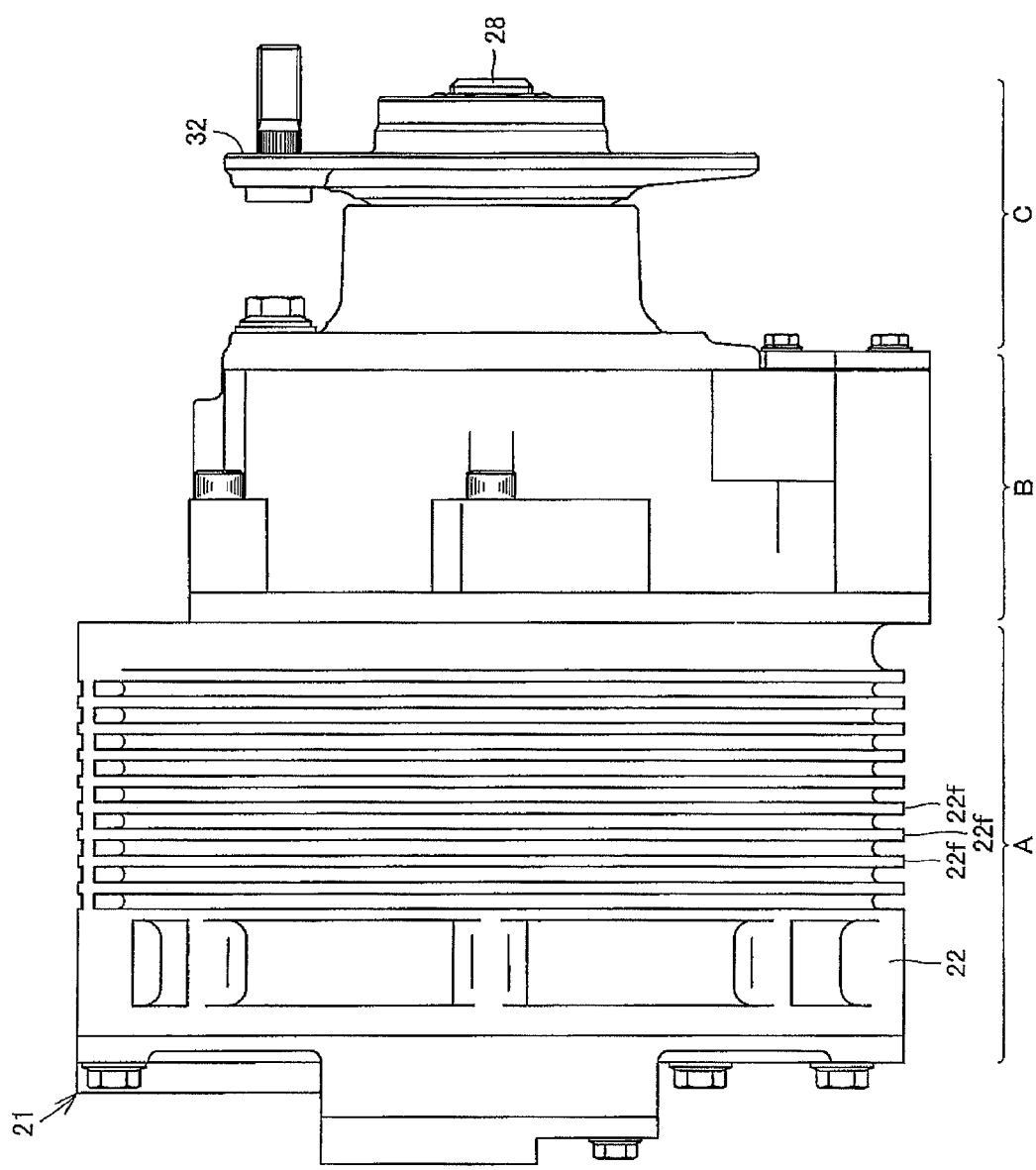
FIG. 3 is a side view of the in-wheel motor drive assembly in FIG. 1.
Figure 4:
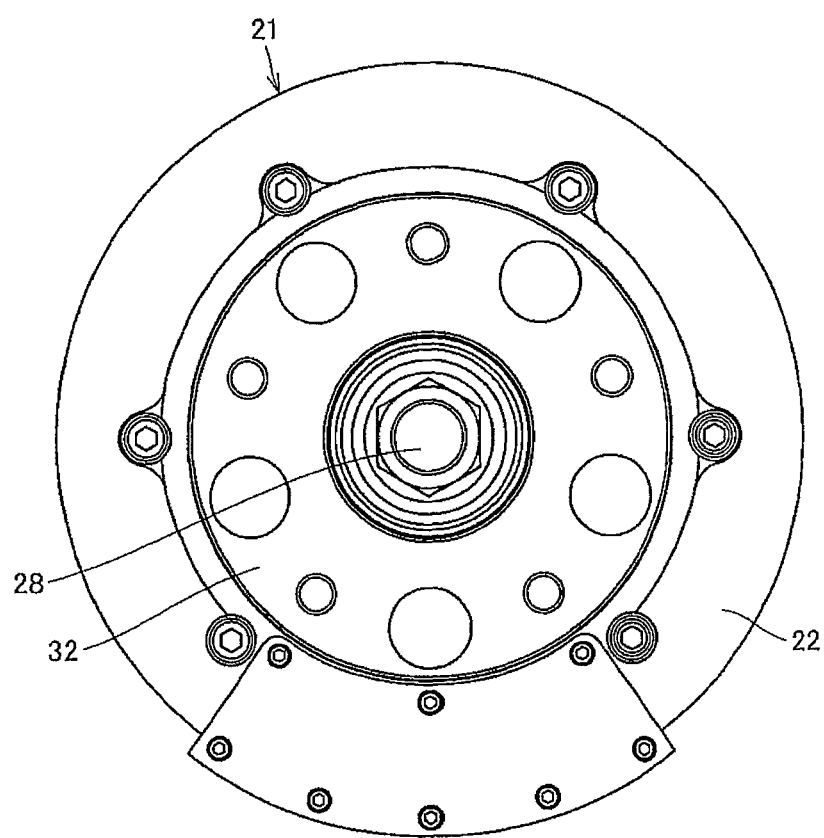
FIG. 4 is a front view of the in-wheel motor drive assembly of FIG. 1, viewed along its axial direction.
Figure 5:
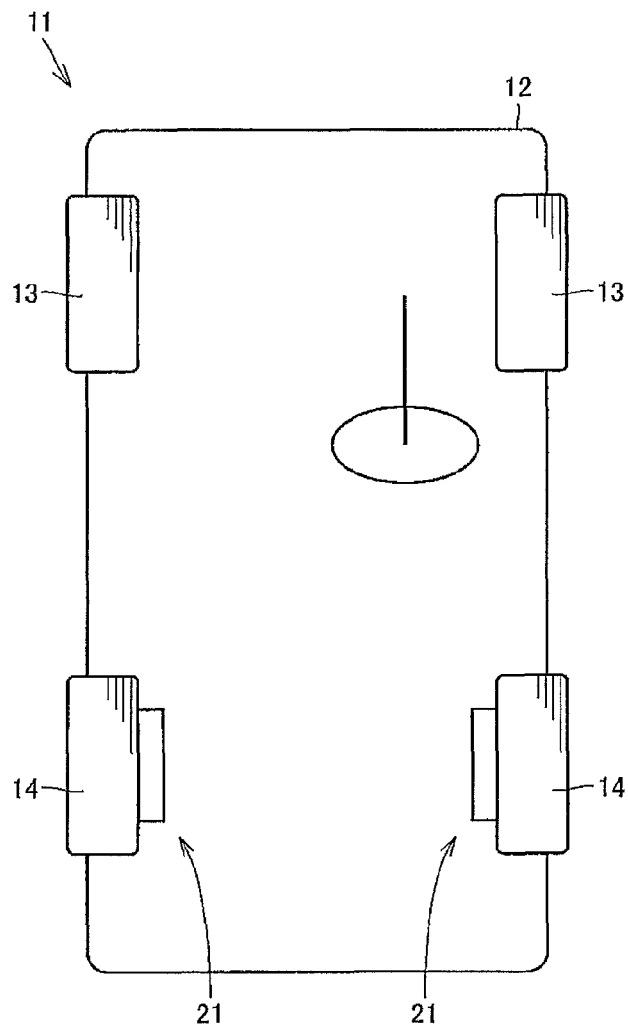
FIG. 5 is a plan view of an electric vehicle with the in-wheel motor drive assembly of FIG. 1.
Figure 6:
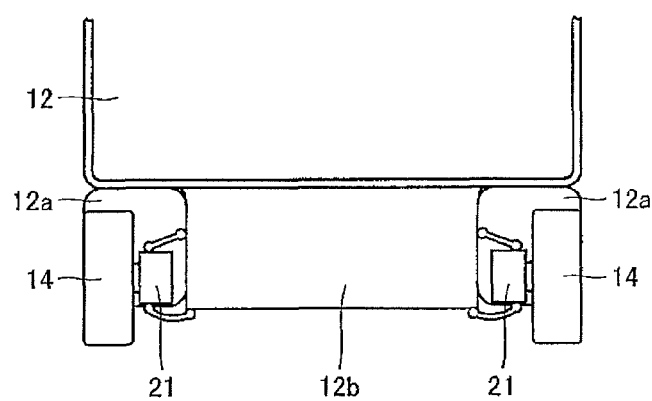
FIG. 6 is a cross-sectional view of a rear side of the electric vehicle in FIG. 5.

An embodiment of the present invention will be described in detail below with reference to examples shown in the drawings. FIG. 1 is a vertical cross-sectional view of an in-wheel motor drive assembly according to the first example of the present invention. FIG. 2 is a cross-sectional view taken from line II-II in FIG. 1. FIG. 3 is a side view of the in-wheel motor drive assembly in FIG. 1. FIG. 4 is a front view of the in-wheel motor drive assembly in FIG. 1, viewed along its axial direction. FIG. 5 is a plan view of an electric vehicle with the in-wheel motor drive assembly of FIG. 1. FIG. 6 is a cross-sectional view of a rear side of the electric vehicle in FIG. 5.

Referring to FIG. 5, an electric vehicle 11 includes a chassis 12, front wheels 13 serving as steering wheels, rear wheels 14 serving as driving wheels, and in-wheel motor drive assemblies 21 that transmit driving force to the right and left rear wheels 14, respectively. Referring to FIG. 6, the rear wheels 14 are housed in wheel housings 12a of the chassis 12 and secured under the chassis 12 with a suspension 12b.

The suspension 12b includes suspension arms extending rightward and leftward therefrom to support the rear wheels 14 and struts incorporating coil springs and shock absorbers to dampen vibration of the chassis 12 by absorbing vibrations that the rear wheels 14 receive from the ground. The right and left suspension arms have stabilizers at their joints to reduce the vehicle body's inclination in cornering. Note that it is preferable that the suspension 12b is an independent suspension capable of moving the right and left wheels upward and downward separately to improve terrain-following ability and to efficiently transmit driving force of the driving wheels to the road surface.

Since the in-wheel motor drive assemblies 21 provided in the electric vehicle 11 drive the right and left rear wheels 14, respectively, and are mounted inside the wheel housings 12a, the electric vehicle 11 does not need to have the motor, drive shafts, differential gear mechanism and other components on the chassis 12. Therefore, the electric vehicle 11 has advantages in the sufficient passenger room and individual rotational control of the right and left driving wheels.

However, further improvement of running stability of the electric vehicle 11 requires reduction in unsprung weight. In addition, the in-wheel motor drive assembly 21 needs to be more compact to provide a still larger passenger room. To achieve these purposes, an in-wheel motor drive assembly 21 as shown in FIG. 1 is adopted as an embodiment of the present invention.

Referring to FIG. 1, the in-wheel motor drive assembly 21, as one example of a vehicle speed reducer, is attached inside the wheel housing 12a of the electric vehicle 11 as shown in FIG. 6, and includes a motor unit A that generates driving force, a speed reduction unit B that reduces the rotational speed of the motor unit A and outputs the reduced rotation, and a wheel-hub bearing unit C that transmits the output from the speed reduction unit B to the driving wheel 14. The motor unit A, speed reduction unit B and wheel-hub bearing unit C are coaxially aligned in this order with an axial direction.

A casing 22 is generally shaped in a cylinder made by combining cylindrical bodies of different outer diameters in the axial direction and forms the contour of the in-wheel motor drive assembly 21. The motor unit A and speed reduction unit B are housed in the casing 22. The wheel-hub bearing unit C includes a wheel hub 32 rotatably supported by the casing 22 to drive the driving wheel 14. The driving wheel 14, which makes contact with the road surface, is arranged on the outermost side of the vehicle width and has an outer diameter sufficiently larger than that of the in-wheel motor drive assembly 21. Such a driving wheel can create clearance between the contact surface and the casing 22.

The details of the casing 22 will be described: a portion of the casing 22 that encloses the motor unit A has the largest outer diameter; a portion of the casing 22 that encloses the speed reduction unit B has the second largest outer diameter; and a portion of the casing 22 that supports the wheel hub 32 has the smallest outer diameter. The outer surface of the casing 22 is exposed to the atmosphere.

A plurality of fins 22f are formed along the outer circumferential surface of the cylindrical casing 22. As shown in FIG. 3, the fins 22f are elongated projections formed in the circumferential direction on the outer surface of the hollow cylindrical portion of the casing 22 that encloses the motor unit A. The fins 22f extend in the axial direction of a motor rotary shaft 35 with spaces therebetween. The projecting fins 22f are arranged along almost the entire circumference of the cylindrical casing 22. The casing 22 has a casing oil passage 55 allowing only lubricating oil to pass through, but not any other passages allowing liquid other than lubricating oil to pass through.

While the electric vehicle 11 is moving, air from the outside that is blown into the wheel housing 12a strikes the casing 22 and the fins 22f are used to enhance the heat dissipation of the casing 22. Especially, in the casing 22, the hollow cylindrical portion that encloses the motor unit A has the largest diameter and can fully receive the air from the outside, and therefore the fins 22f can provide a great heat dissipation effect.

The motor unit A is a radial gap motor including a stator 23 secured to an inner circumferential surface of the casing 22, a rotor 24 arranged so as to be opposed to the inner side of the stator 23 with a radial gap therebetween, and a motor rotary shaft 35 fixedly connected inside the rotor 24 to rotate together with the rotor 24. The rotor 24 includes a hollow cylindrical rotor body 24a made by stacking a plurality of discs with through holes at its center and a cylindrical rotor support 24b held by the inner circumferential surface of the rotor body 24a and the outer circumferential surface of the motor rotary shaft 35 and supporting the rotor body 24a at the axial center of the motor rotary shaft 35. The opposite ends of the motor rotary shaft 35 are rotatably supported by the casing 22 with rolling bearings 36a, 36b. In addition, among the ends of the motor rotary shaft 35, one near the speed reduction unit B is coupled to an input shaft 25 of the speed reduction unit B.

The speed reduction unit B includes: the input shaft 25 therein; eccentric members 25a, 25b eccentrically mounted on one end of the input shaft 25, the end being remote from the motor rotary shaft 35; curved plates 26a, 26b whose inner circumferential surface is attached to the outer circumferential surface of the eccentric members 25a, 25b so as to rotate with respect to the eccentric members 25a, 25b, the curved plates 26a, 26b serving as revolution members that make orbital motion about the rotational axis of the rotating input shaft 25; a plurality of outer pins 27 serving as perimeter engagement members that engage with the perimeter of the curved plates 26a, 26b to make axial rotation of the curved plates 26a, 26b; a motion conversion mechanism that extracts only the axial rotation of the curved plates 26a, 26b and transmits it to an output shaft 28; the output shaft 28 that outputs the axial rotation, which was reduced in speed in the speed reduction unit B, to the wheel-hub bearing unit C; and counter weights 29 attached adjacent to the eccentric members 25a, 25b, respectively, on the input shaft 25. In addition, the speed reduction unit B is supplied with lubrication oil through a lubrication oil circuit, which will be described later.

One end of the input shaft 25 on the side of the wheel-hub bearing unit C is supported by a rolling bearing 36c in the speed reduction unit B. Another end of the input shaft 25 on the side of the motor unit A is fitted in an end of the motor rotary shaft 35. The eccentric members 25a, 25b, which are attached to an end portion of the input shaft 25, are disc-like eccentric members attached eccentrically from the axis. In addition, the two eccentric members 25a, 25b are provided such that their phases are shifted by 180° in order to counterbalance the centrifugal forces generated by eccentric motion thereof.

The output shaft 28, which is coaxially aligned with the motor rotary shaft 35 and input shaft 25, extends from the speed reduction unit B to the wheel-hub bearing unit C and includes a shaft portion 28b and a flange portion 28a formed at an end, near to the speed reduction unit B, of the shaft portion 28b. The flange portion 28a formed at the end of the output shaft 28 in the speed reduction unit B is arranged so as to receive an end portion of the input shaft 25 coupled with the eccentric members 25a, 25b. The flange portion 28a has a center hole that receives the end of the input shaft 25 and rotatably supports the end of the input shaft 25 with the rolling bearing 36c. In addition, the flange portion 28a has an end surface with holes equidistantly formed in the circumferential direction of the flange portion 28a centered around the rotational axis of the output shaft 28 to hold the inner pins 31. The holes extend in parallel with the axis of the output shaft 28. The outer circumferential surface of the shaft portion 28b fits in the wheel hub 32 of the wheel-hub bearing unit C.

Referring to FIG. 2, the curved plate 26b has a plurality of waveforms in the form of trochoid curves, such as epitrochoid curves, along its perimeter, and has a plurality of through holes 30a and 30b penetrating from one side end face to the other side end face. The through holes 30a are equidistantly formed in the circumferential direction centered around the rotational axis of the curved plate 26b and receive the inner pins 31 which will be described later. The through hole 30b is formed at the center (rotational axis) of the curved plate 26b and holds the eccentric member 25b so as to concentrically arrange the outer side of the eccentric members 25b.

The curved plate 26b is rotatably supported by the rolling bearing 41 with respect to the eccentric members 25b. The rolling bearing 41 is a cylindrical roller bearing including an inner ring member 42 that fits along the outer circumferential surface of the eccentric member 25b and has an inner raceway 42a on its outer circumferential surface, an outer raceway 43 that is directly formed in the inner circumferential surface of the through hole 30b of the curved plate 26b, a plurality of cylindrical rollers 44 arranged between the inner raceway 42a and outer raceway 43, and a retainer (not shown) that retains the interval between the adjacent cylindrical rollers 44. The rolling bearing 41 can be a deep groove ball bearing. The inner ring member 42 further includes a pair of shoulders axially opposed to each other on the inner raceway 42a on which the cylindrical rollers 44 roll. The cylindrical rollers 44 are retained between the shoulders.

The outer pins 27 are equidistantly provided along a circumferential track centered around the rotational axis of the input shaft 25. The outer pins 27 extend in parallel with the axis and are held at the opposite ends by outer-pin holders 45 fixedly fitted in an inner wall of the casing 22 that encloses the speed reduction unit B. More specifically, the axially opposite ends of the outer pins 27 are rotatably supported by needle roller bearings 27a attached to the outer-pin holders 45.

When the curved plates 26a, 26b make orbital motion around the rotational axis of the input shaft 25, the curved waveforms engage with the outer pins 27 to cause the curved plates 26a, 26b to make axial rotation. In addition, the needle roller bearings 27a attached to the opposite ends of the outer pins 27 reduce frictional resistance between the curved plates 26a, 26b and the outer pins 27 abutting the outer perimeters of the curved plates 26a, 26b.

The counter weights 29 are disks each having an off-center through hole in which the input shaft 25 fits and are arranged 180° out of phase with the adjacent eccentric members 25a, 25b, respectively, in order to cancel the unbalance inertia couple generated by revolution of the curved plates 26a, 26b.

The motion conversion mechanism includes a plurality of inner pins 31 serving as inner engagement members implanted in the flange portion 28a of the output shaft 28 and through holes 30a formed in the curved plates 26a, 26b. The inner pins 31 are equidistantly provided on a circumferential track around the rotational axis of the output shaft 28, extend in parallel with the axis of the output shaft 28, and have base ends fixed to the output shaft 28. In addition, needle roller bearings 31a with hollow cylindrical rollers or needle rollers are provided on the outer circumferential surface of the inner pins 31. The needle roller bearings 31a reduce frictional resistance between the curved plates 26a, 26b and the inner pins 31 abutting the inner circumferential surface of the through holes 30a of the curved plates 26a, 26b.

The top ends of the inner pins 31 are press-fitted into a reinforcing member 31b for reinforcing the inner pins 31 so as to fixedly connect to the reinforcing member 31b. The inner-pin reinforcing member 31b includes a ring-like flange portion 31c connecting the top ends of the inner pins 31 and a cylindrical-shaped cylinder portion 31d connected with the inner circumference of the flange portion 31c and extending in the axial direction away from the inner pins 31. The inner-pin reinforcing member 31b that reinforces the multiple inner pins 31 spreads the loads placed on some inner pins 31 by the curved plates 26a, 26b evenly to every inner pin 31.

The inner pins 31 pass through through holes 30a formed at radial parts of the curved plates 26a, 26b between the perimeter of the curved plates 26a, 26b and the axis of the input shaft 25. The through holes 30a are provided so as to correspond to the inner pins 31, respectively. In addition, the diameter of the through holes 30a is set so as to be larger by a predetermined size than the outer diameter of the inner pins 31 (indicating "the maximum outer diameter including the outer diameter of the needle roller bearing 31a, and the same is applied hereinafter). Therefore, the inner pins 31 extending through the through holes 30a formed in the curved plates 26a, 26b function as inner engagement members each engaged with the through hole 30a.

The cylinder portion 31d is drivingly connected with a lubrication oil pump 51. When the plurality of inner pins 31 are revolved with the output shaft 28, the cylinder portion 31d rotated by the inner pins 31 drives the lubrication oil pump 51. The lubrication oil pump 51 provided inside the casing 22 is driven by an output of the motor unit A to circulate lubrication oil inside the in-wheel motor drive assembly 21.

The wheel-hub bearing unit C includes a wheel hub 32 fixedly coupled to the output shaft 28 and a wheel-hub bearing 33 rotatably supporting the wheel hub 32 with respect to the casing 22. The wheel-hub bearing 33 is a double row angular ball bearing having an inner ring fixedly fitting to the outer circumferential surface of the wheel hub 32. The outer raceway of the wheel-hub bearing 33 is formed in a portion of the casing 22 that encloses the wheel-hub bearing unit C. The wheel hub 32 includes a cylindrical hollow portion 32a connected with an end of the output shaft 28 and a flange portion 32b formed on an end of the wheel hub 32 remote from the speed reduction unit B. The flange portion 32b is fixedly connected to a driving wheel 14, indicated by imaginary lines in FIG. 1, with bolts 32c.

The operating principles of the thus configured in-wheel motor drive assembly 21 will be described in detail.

In the motor unit A, for example, a rotor 24 made of a permanent magnet or magnetic material receives electromagnetic force generated by supplying AC current to a coil of the stator 23 and then rotates.

The rotation of the rotor 24 allows the motor rotary shaft 35 connected with the rotor 24 to output rotation, and the rotation of the motor rotary shaft 35 and input shaft 25 causes the curved plates 26a, 26b to make orbital motion around the rotational axis O of the input shaft 25. At that time, the outer pins 27 roll on the curved waveforms of the curved plates 26a, 26b so as to engage therewith to cause the curved plates 26a, 26b to make axial rotation in the reverse direction of the input shaft's 25 rotation.

The inner pins 31, which are in the through holes 30a and sufficiently smaller than the diameter of the through holes 30a, abut against the walls of the through holes 30a with the axial rotation of the curved plates 26a, 26b. Thus, the orbital motion of the curved plates 26a, 26b is not transmitted to the inner pins 31, but only the axial rotation of the curved plates 26a, 26b is transmitted to the wheel-hub bearing unit C via the output shaft 28. As described above, the through holes 30a and inner pins 31 play a role of a motion conversion mechanism.

Through the motion conversion mechanism, the output shaft 28 coaxially aligned with the input shaft 25 extracts the axial rotation of the curved plates 26a, 26b as an output of the speed reduction unit B. Consequently, the rotational speed of the input shaft 25 is reduced by the speed reduction unit B and transmitted to the output shaft 28. Even if the employed motor unit A produces a low torque at a high rotational speed, adequate torque required for the driving wheels can be transmitted.

A reduction ratio of the above-described speed reduction unit B is calculated by $(Z_A - Z_B)/Z_B$, wherein $Z_A$ represents the number of the outer pins 27 and $Z_B$ represents the number of the waveforms of the curved plates 26a, 26b. In the example shown in FIG. 2 where $Z_A = 12$ and $Z_B = 11$, the reduction ratio results in 1/11, which is a considerably high reduction ratio.

Employment of such a cycloid speed reduction mechanism, capable of obtaining a high reduction ratio without multi-stage configuration, as the speed reduction unit B can provide a compact in-wheel motor drive assembly 21 with a high reduction ratio.

Next, the lubrication oil circuit of the first example will be described.

The aforementioned lubrication oil pump 51 is provided in a partition wall of the casing 22 that separates the motor unit A from the speed reduction unit B. The lubrication oil pump 51 is driven by the reinforcing member 31b. An intake oil passage 52 provided in the partition wall of the casing 22 connects an inlet port of the lubrication oil pump 51 provided along the axis and an oil reservoir 53 provided at a lower part of the speed reduction unit B. A discharge oil passage 54 provided in the partition wall of the casing 22 has one end connected to an outlet port of the lubrication oil pump 51 and the other end connected to an end of a casing oil passage 55 provided in the casing 22 corresponding to the position of the motor unit A.

The casing oil passage 55 is formed inside a hollow cylindrical wall, which makes up the outer circumferential portion of the motor unit A, of the casing 22. When the electric vehicle 11 is moving, air from the outside strikes the outer surface of the casing 22, and therefore the lubrication oil flowing through the casing oil passage 55 is cooled. The other end of the casing oil passage 55 is connected to a radially outer end of a connection oil passage 56. The connection oil passage 56 is formed inside a disk-like rear cover 22t that makes up an axial end of the motor unit A in the casing 22. A radially inner end of the connection oil passage 56 is connected to a motor-rotary-shaft oil passage 57 provided in the motor rotary shaft 35.

The motor-rotary-shaft oil passage 57 formed inside the motor rotary shaft 35 extends along the axis.

Of the opposite ends of the motor-rotary-shaft oil passage 57, one end positioned near the speed reduction unit B is connected to a speed-reduction-unit input-shaft oil passage 58 provided in the input shaft 25 and extending along the axis. The other end remote from the speed reduction unit B is connected to the above-mentioned radially inner end of the connection oil passage 56. In addition, the motor-rotary-shaft oil passage 57 is connected at its center in the axial direction with a radially inner end of a rotor oil passage 59.

The speed-reduction-unit input-shaft oil passage 58 formed inside the input shaft 25 extends along the axis and passes through the end of the input shaft 25 that faces the flange portion 28a. The speed-reduction-unit input-shaft oil passage 58 is branched into a lubrication oil passage 58a extending radially outward so as to pass through the eccentric members 25a and a lubrication oil passage 58b extending radially outward so as to pass through the eccentric members 25b. The radially outer ends of the lubrication oil passages 58a, 58b are connected with the inner raceway 42a of the rolling bearing 41.

The rotor oil passage 59 is an oil passage that is branched from the motor-rotary-shaft oil passage 57 and formed inside the rotor support 24b so as to reach the rotor body 24a.

The lubrication oil pump 51 to be driven by the output shaft 28 via the reinforcing member 31b takes up lubrication oil retained in the oil reservoir 53 through the intake oil passage 52 and discharges the lubrication oil to the discharge oil passage 54. Since air from the outside strikes the outer surface of the casing 22 while the electric vehicle is moving, the lubrication oil flowing from the discharge oil passage 54 to the casing oil passage 55 is cooled while passing through the casing oil passage 55 and connection oil passage 56 in succession.

Subsequently, the lubrication oil passes through the motor-rotary-shaft oil passage 57 and speed-reduction-unit input-shaft oil passage 58 in succession and is diverted into the lubrication oil passages 58a, 58b to lubricate the rolling bearing 41 provided to the eccentric member 25a and the rolling bearing 41 provided to the eccentric member 25b. The lubrication oil flows in radial directions by the action of centrifugal force and lubricates even the curved plates 26a, 26b, inner pins 31 and outer pins 27 in succession. Such shaft center lubrication suitably lubricates the interior of the speed reduction unit B, and the lubrication oil is trapped in the oil reservoir 53 provided in the lower part of the speed reduction unit B. As described above, the lubrication oil circulates in the motor unit A and speed reduction unit B.

The in-wheel motor drive assembly 21 of the first example can be air-cooled with the help of air from the outside hitting the outer surface of the casing 22. Especially, since the fins 22f enhance the heat dispersion effect on the casing 22, the lubrication oil efficiently cooled in the casing oil passage 55 of the casing 22 can effectively reduce the temperature rise of the motor unit A and speed reduction unit B. As a result, the in-wheel motor drive assembly 21 can be effectively air-cooled.

The stator 23 is relatively easy to be cooled because the stator 23 is adjacent to the casing 22. On the contrary, if no measures are taken, the rotor 24 that is positioned away from the casing 22 cannot benefit from the air-cooling effect. To solve the problem, the present example allows a portion of the well-cooled lubrication oil to flow from the motor-rotary-shaft oil passage 57 to the rotor oil passage 59, thereby reducing the temperature rise of the rotor 24. Even if the in-wheel motor drive assembly 21 employs an air-cooled system, the present example can enhance the cooling effect of the rotor 24 positioned far inside of the casing 22. As a result, the entire motor unit A can be cooled.

Figure 7:
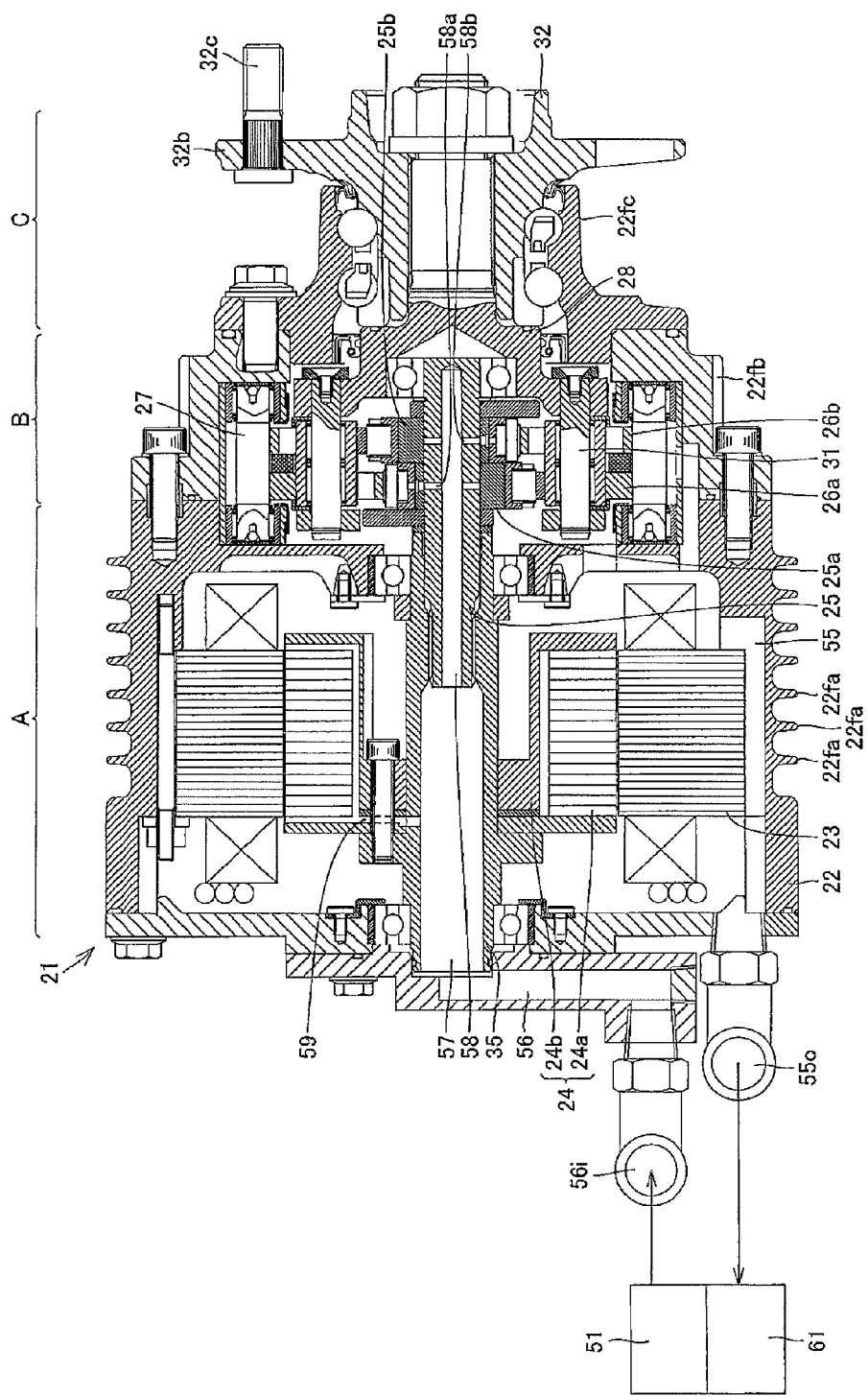
FIG. 7 is a vertical cross-sectional view of an in-wheel motor drive assembly according to the second example of the present invention.
Figure 8:
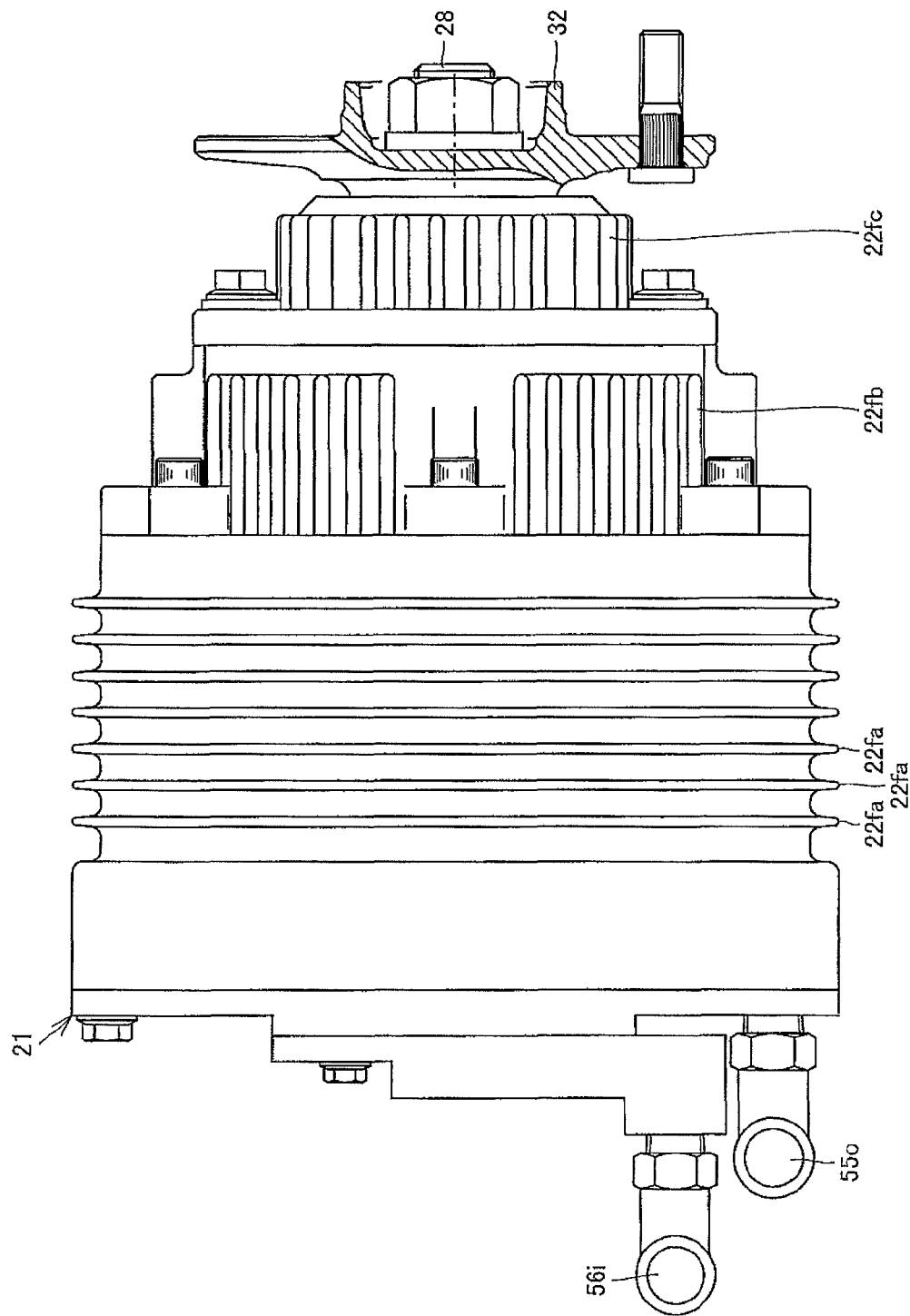
FIG. 8 is a side view of the in-wheel motor drive assembly in FIG. 7.
Figure 9:
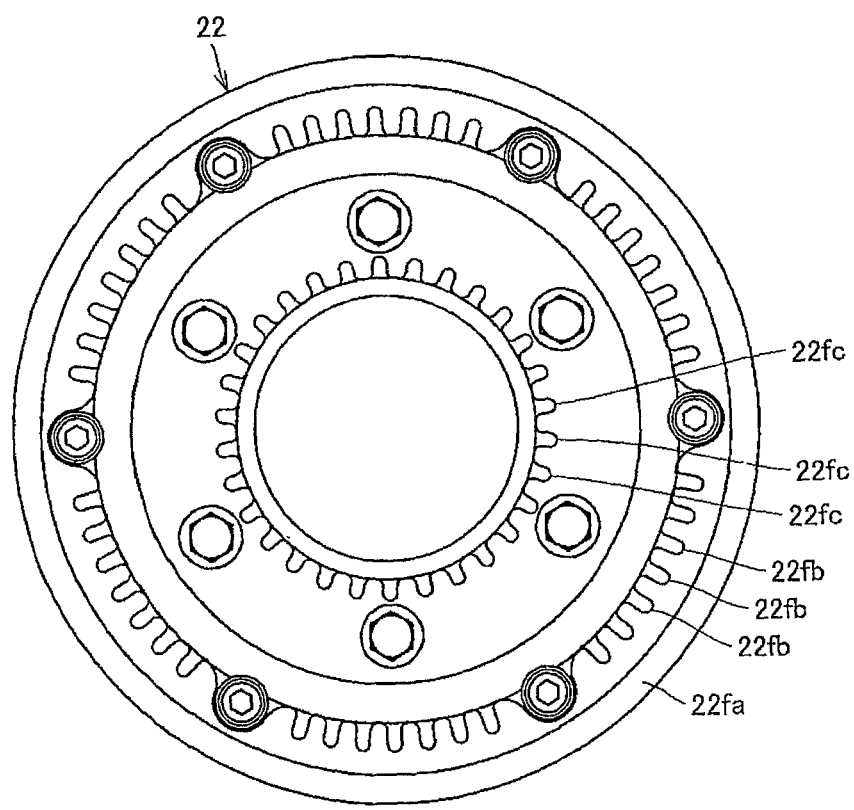
FIG. 9 is a front view of a casing in the second example, removed and viewed along the axial direction.

Next, the second example of the present invention will be described. FIG. 7 is a vertical cross-sectional view of an in-wheel motor drive assembly of the second example, FIG. 8 is a side view of the in-wheel motor drive assembly in FIG. 7, and FIG. 9 is a front view of a casing in the second example, the casing being removed and viewed along the axial direction. Through the second example, components common with those in the first example are marked with the same numerals as the first example and will not be further explained, but different components will be described below. In the second example, as shown in FIG. 7, a lubrication oil pump 51 is separately provided outside a casing. In one example, the lubrication oil pump 51 is provided on the chassis 12 and driven by a driving source (not show) except for a motor unit A.

A casing oil passage 55 provided along the inner circumferential surface of the casing 22 is positioned at a lower part of the motor unit A and also plays a role of an oil reservoir in which oil inside the motor unit A is trapped.

A discharge port of the lubrication oil pump 51 is connected to an inlet port 56$i$, which makes up a radially outer end of a connection oil passage 56, with a flexible hose (not shown). An intake port of the lubrication oil pump 51 is connected to an outlet port 55$o$, which makes up an end of the casing oil passage 55 that is remote from the speed reduction unit B, with a flexible hose (not shown).

An air-cooled type oil cooler 61 is disposed adjacent to the lubrication oil pump 51. The air-cooled type oil cooler 61 is exposed to the atmosphere, and therefore the lubrication oil flowing from the outlet port 55$o$ into the lubrication oil pump 51 is cooled by air.

The lubrication oil pump 51 of the second example driven by a driving source (not shown) takes up lubrication oil from the outlet port 55$o$ of the casing oil passage 55 and discharges the lubrication oil into the inlet port 56$i$ of the connection oil passage 56. The lubrication oil then successively passes the motor-rotary-shaft oil passage 57 and speed-reduction-unit input-shaft oil passage 58 and is divided to separately flow through the lubrication oil passages 58$a$, 58$b$ to lubricate the rolling bearing 41 provided to the eccentric members 25$a$ and the rolling bearing 41 provided to the eccentric members 25$b$, respectively. The lubrication oil flows in radial directions by the action of centrifugal force to lubricate even the curved plates 26$a$, 26$b$, inner pins 31 and outer pins 27 in succession. Such shaft center lubrication suitably lubricates the interior of the speed reduction unit B. Subsequently, the lubrication oil flows into the casing oil passage 55 and again enters the lubrication oil pump 51 from the outlet port 55$o$. As described above, the lubrication oil circulates in the motor unit A and speed reduction unit B.

Since the in-wheel motor drive assembly 21 of the second example shown in FIGS. 7 to 9 has the lubrication oil pump 51 separately provided outside the casing 22, greater weight reduction of the in-wheel motor drive assembly can be achieved. Therefore, the unsprung weight of the suspension 12$b$ is reduced, thereby improving terrain-following ability, resulting in enhanced riding comfort.

Since the air-cooled type oil cooler 61 is provided outside the in-wheel motor drive assembly 21 in the second example, further reduction in temperature of lubrication oil can be achieved. Therefore, the in-wheel motor drive assembly can have additional prevention from temperature increases through the air-cooling system.

In addition to the fins 22$fa$, fins 22$fb$ and fins 22$fc$ are provided on the outer surface of the casing 22. The fins 22$fa$ are formed on the outer surface of a portion of the casing 22 that encloses the motor unit A. The fins 22$fa$ are the same as the fins 22$f$ shown in FIG. 3.

The fins 22$fb$ are formed on the outer surface of a portion of the casing 22 that encloses the speed reduction unit B. The fins 22$fb$ are a plurality of elongated projections extending in parallel with the input shaft 25 and equidistantly arranged along the circumferential direction. Of the casing 22, the portion enclosing the speed reduction unit B has an outer diameter smaller than the outer diameter of the portion enclosing the motor unit A, and therefore the fins 22$fb$ are positioned radially inside the outer surface of the portion enclosing the motor unit A. The lubrication oil flowing inside the speed reduction unit B is supplied through the shaft center, flows radially outward over the outer pins 27, reaches the inner circumferential surface of the casing 22, and is cooled by the heat dispersion action of the fins 22$fb$.

The fins 22$fc$ are formed on the outer surface of a portion, included in the wheel-hub bearing unit C, of the casing 22. In other words, the fins 22$fc$ are arranged axially at the same position as the wheel-hub bearing 33 and radially outside the wheel-hub bearing 33. The fins 22$fc$ are a plurality of elongated projections extending in the axial direction and equidistantly arranged in the circumferential direction. Of the casing 22, the portion enclosing the wheel-hub bearing unit C has an outer diameter smaller than the outer diameter of the portion enclosing the speed reduction unit B, and therefore the fins 22$fc$ are positioned radially inside the portion enclosing the speed reduction unit B.

According to the air-cooled type in-wheel motor drive assembly 21 in the second example shown in FIG. 8, the plurality of fins 22$f$ provided for the motor unit A, speed reduction unit B and wheel-hub bearing unit C can further improve the cooling efficiency of the air-cooled type in-wheel motor drive assembly. Therefore, the in-wheel motor drive assembly 21 can be further efficiently air-cooled by using air from the outside hitting the outer surface of the casing.

Figure 10:
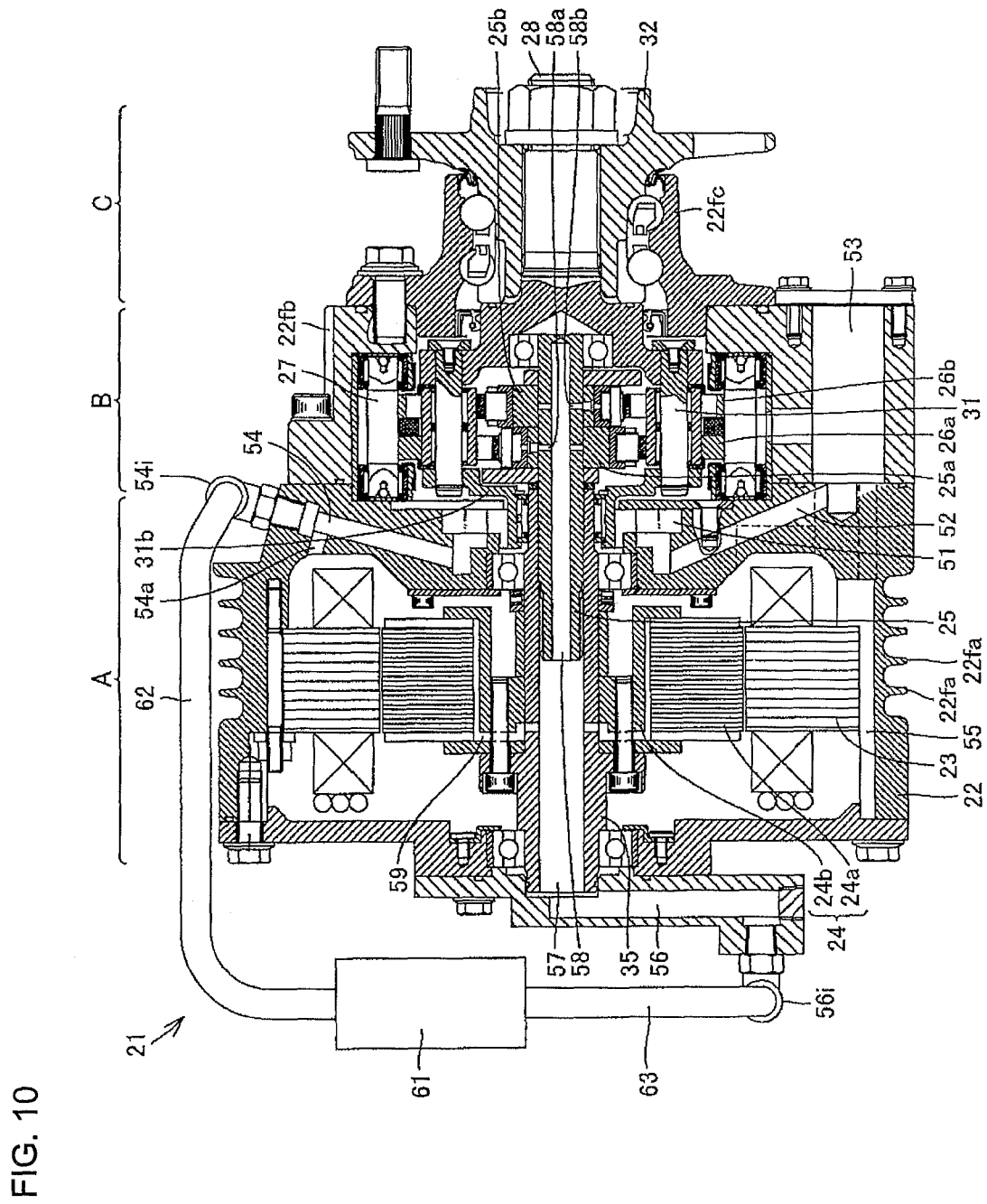
FIG. 10 is a vertical cross-sectional view of an in-wheel motor drive assembly according to the third example of the present invention.

Next, the third example of the present invention will be described. FIG. 10 is a vertical cross-sectional view of an in-wheel motor drive assembly according to the third example. Through the third example, components common with those in the above-described embodiments are marked with the same numerals as the embodiments and will not be further explained, but different components will be described below. The in-wheel motor drive assembly 21 of the third example further includes an air-cooled type oil cooler 61 that cools lubrication oil supplied from a lubrication oil circuit and returns the cooled lubrication oil to the lubrication oil circuit, instead of the casing oil passage 55.

The air-cooled type oil cooler 61 is separately disposed outside the casing 22. The air-cooled type oil cooler 61 has an inlet port connected to a radially outer end 54$i$ of a discharge oil passage 54 provided in the casing 22 with a flexible inlet hose 62. The air-cooled type oil cooler 61 has an outlet port connected to an inlet port 56i, which is a radially outer end of a connection oil passage 56 provided on the casing 22, with a flexible outlet hose 63.

The casing oil passage 55 provided on the inner circumferential surface of the casing 22 is positioned at a lower part of the motor unit A and connected to an oil reservoir 53. The casing oil passage 55 also plays a role of an oil reservoir in which oil inside the motor unit A is trapped.

As shown in FIG. 10, the lubrication oil pump 51 driven by an output shaft 28 via a reinforcing member 31b takes up lubrication oil retained in an oil reservoir 53 through an intake oil passage 52 and discharges the lubrication oil to a discharge oil passage 54. A discharge oil passage 54 connecting the discharge port of the lubrication oil pump 51 and the motor-rotary-shaft oil passage 57 includes a stator branch oil passage 54a branched off from the discharge oil passage 54 and directed to a stator 23 in order to supply lubrication oil to the stator 23 through the stator branch oil passage 54a to directly cool the stator 23. Since air from the outside hits the outer surface of the casing 22, inlet hose 62, air-cooled type oil cooler 61 and outlet hose 63 while the electric vehicle is moving, the lubrication oil is cooled while successively passing through the inlet hose 62, air-cooled type oil cooler 61, outlet hose 63 and connection oil passage 56.

According to the in-wheel motor drive assembly 21 of the third example shown in FIG. 10, air from the outside hitting the air-cooled type oil cooler 61 can cool the lubrication oil circulating in the in-wheel motor drive assembly 21. Thus, the in-wheel motor drive assembly 21 can be further efficiently air-cooled.

Although it is not shown in the drawings, the air-cooled type oil cooler 61 can be attached to the outer surface of the casing 22. It is also not shown in the drawings; however, the air-cooled type oil cooler 61 can be of course connected with the casing oil passage 55 in series or in parallel in a modification.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

Industrial Applicability

The in-wheel motor drive assembly according to the present invention is advantageously used in electric vehicles and hybrid vehicles.

Reference Signs List

11: electric vehicle; 12: chassis; 12a: wheel housing; 12b: suspension; 14: driving wheel (rear wheel); 21: in-wheel motor drive assembly; 22: casing; 22f, 22fa, 22fb, 22fc: fin; 22t: rear cover; 23: stator; 24: rotor; 24a: rotor body; 24b: rotor support; 25: input shaft; 25a, 25b: eccentric member; 26a, 26b: curved plate; 27: outer pin; 28: output shaft; 28a: flange portion; 28b: shaft portion; 30a, 30b: through hole; 31: inner pin; 31b: reinforcing member; 32: wheel hub; 32a: hollow portion; 32b: flange portion; 33: wheel-hub bearing; 35: motor rotary shaft; 41: rolling bearing; 45: outer-pin holder; 51: lubrication oil pump; 52: intake oil passage; 53: oil reservoir; 54: discharge oil passage; 55: casing oil passage; 56: connection oil passage; 57: motor-rotary-shaft oil passage; 58: speed-reduction-unit input-shaft oil passage; 58a, 58b: lubrication oil passage; 59: rotor oil passage; 61: air-cooled type oil cooler.

The invention claimed is:

1. An in-wheel motor drive assembly comprising:
   a casing having an outer fin set including a plurality of fins formed along an outer circumferential surface of the cylindrical casing;
   a motor unit housed in the casing and including a motor rotary shaft for outputting rotation;
   a speed reduction unit housed in the casing, including an input shaft connected with the motor rotary shaft and an output shaft, reducing the rotational speed of the input shaft and transmitting the reduced rotation to the output shaft;
   a wheel hub rotatably supported by the casing and fixedly connected with the output shaft; and
   a lubrication oil circuit including:
      a lubrication oil pump discharging lubrication oil;
      a discharge oil passage, one end thereof connected to an outlet port of the lubrication oil pump;
      a casing oil passage, one end thereof connected to another end of the discharge oil passage and provided to the casing;
      a connection oil passage, one end thereof connected to another end of the casing oil passage,
      a motor-rotary-shaft oil passage, one end thereof connected to another end of the connection oil passage and provided in the motor rotary shaft; and
      a speed-reduction-unit input-shaft oil passage, one end thereof connected to another end of the motor-rotary-shaft oil passage, another end of the speed-reduction-unit input-shaft oil passage connected to an interior of the speed reduction unit, the speed-reduction-unit input-shaft oil passage provided in the input shaft, wherein
      the lubrication oil discharged from the lubrication oil pump circulates through the interconnected discharge oil passage, casing oil passage, connected oil passage, motor-rotary-shaft oil passage, speed-reduction-unit input-shaft oil passage and an interior of the speed reduction unit to lubricate the speed reduction unit,
   wherein a portion of the casing oil passage is formed in a thickness of a cylindrical wall of the casing, and the cylindrical wall having the casing oil passage portion formed therein makes up the outer circumferential portion of the casing housing the motor unit,
   the casing oil passage portion extends from one axial end to another axial end of the cylindrical wall, and
   the outer fin set is formed on an outer surface of the cylindrical wall in order to cool the lubrication oil flowing in the casing oil passage portion.

2. The in-wheel motor drive assembly according to claim 1, wherein the outer fin set is formed on an outer surface of a portion of the casing, the portion enclosing the motor unit.

3. The in-wheel motor drive assembly according to claim 2, wherein the motor rotary shaft of the motor unit is coaxially aligned with the wheel hub, and
   the outer fin set includes a plurality of elongated projections extending along the circumferential direction of the casing with spaces therebetween.

4. The in-wheel motor drive assembly according to claim 2, wherein the outer fin set is additionally formed on an outer surface of a portion of the casing, the portion enclosing the speed reduction unit, and on an outer surface of a portion of the casing, the portion rotatably supporting the wheel hub.

5. The in-wheel motor drive assembly according to claim 1, wherein the lubrication oil pump is provided inside the casing.

6. The in-wheel motor drive assembly according to claim 5, wherein the lubrication oil pump is driven by an output shaft of the speed reduction unit.

7. The in-wheel motor drive assembly according to claim 1, wherein the speed reduction unit adopts a cycloid speed reduction mechanism that reduces the rotational speed of the input shaft and transmits the reduced rotation to the output shaft, and comprises:
- a disk-like eccentric member connected to an end of the input shaft so as to be eccentric from a rotational axis of the input shaft;
- a revolution member whose inner circumference is attached to the outer circumference of the eccentric member so as to rotate with respect to the eccentric member, the revolution member making orbital motion around the rotational axis with rotation of the input shaft;
- a perimeter engagement member engaging with the outer perimeter of the revolution member to allow the revolution member to make axial rotation; and
- a motion conversion mechanism extracting only the axial rotation of the revolution member to transmit the axial rotation to the output shaft.

8. The in-wheel motor drive assembly according to claim 7, wherein the motion conversion mechanism includes a plurality of holes equidistantly formed in the revolution member in a circumferential direction about a rotational axis; and a plurality of inner engagement members equidistantly provided on an end of the output shaft in the circumferential direction about the axis of the output shaft and fitting in the holes.

9. The in-wheel motor drive assembly according to claim 1, wherein the casing includes a plurality of elongated projecting fins extending in parallel with the axial direction and formed in the circumferential direction with spaces therebetween, wherein the elongated projecting fins are arranged at axially the same position as a wheel hub bearing for rotatably supporting the wheel hub and radially outside the wheel hub bearing.

10. The in-wheel motor drive assembly according to claim 1, further comprising an air-cooled type oil cooler provided separately away from the motor unit and having a lubrication oil inlet port and a lubrication oil outlet port connected to the oil passage provided to the casing to cool the lubrication oil supplied from the lubrication oil circuit and return the lubrication oil to the lubrication oil circuit.

11. The in-wheel motor drive assembly according to claim 1, wherein the lubrication oil circuit further includes a rotor oil passage branched off from the motor-rotary-shaft oil passage and provided to a rotor of the motor unit.

12. The in-wheel motor drive assembly according to claim 1, wherein the lubrication oil circuit further includes a stator branch oil passage branched off from an oil passage connecting a discharge port of the lubrication oil pump and the motor-rotary-shaft oil passage to supply the lubrication oil to a stator of the motor unit.

* * * * *